United States Patent
Chen et al.

(10) Patent No.: US 11,579,446 B2
(45) Date of Patent: Feb. 14, 2023

(54) AUGMENTED REALITY OPTICAL MODULE

(71) Applicant: SeeYa Optronics Co., Ltd., Shanghai (CN)

(72) Inventors: Guokai Chen, Shanghai (CN); Liu Lu, Shanghai (CN); Qiu Sunjie, Shanghai (CN); Niu Lei, Shanghai (CN); Liu Bo, Shanghai (CN)

(73) Assignee: SeeYA Optronics Co., Ltd., Shanghai (CN)

( * ) Notice: Subject to any disclaimer, the term of this patent is extended or adjusted under 35 U.S.C. 154(b) by 240 days.

(21) Appl. No.: 17/004,385

(22) Filed: Aug. 27, 2020

(65) Prior Publication Data

US 2021/0199962 A1    Jul. 1, 2021

(30) Foreign Application Priority Data

Dec. 31, 2019  (CN) .......................... 201911418053.4

(51) Int. Cl.
*G02B 27/01* (2006.01)
*G02B 27/14* (2006.01)
*G02B 27/28* (2006.01)

(52) U.S. Cl.
CPC ......... *G02B 27/0101* (2013.01); *G02B 27/14* (2013.01); *G02B 27/286* (2013.01); *G02B 2027/012* (2013.01)

(58) Field of Classification Search
CPC .. G02B 27/0101; G02B 27/14; G02B 27/286; G02B 2027/012
USPC .................................................... 359/489.07
See application file for complete search history.

(56) References Cited

U.S. PATENT DOCUMENTS

| 2017/0255017 | A1  | 9/2017 | Haseltine |
| 2018/0039052 | A1* | 2/2018 | Khan .................. G02B 17/0856 |
| 2018/0136473 | A1  | 5/2018 | Cobb et al. |

FOREIGN PATENT DOCUMENTS

| CN | 107966811 A | 4/2018 |
| CN | 108897136 A | 11/2018 |
| CN | 110146798 A | 8/2019 |
| CN | 110161683 A | 8/2019 |
| CN | 209542958 U | 10/2019 |

OTHER PUBLICATIONS

Chinese Office Action dated May 28, 2021, Application No. 201911418053.4.

* cited by examiner

*Primary Examiner* — Marin Pichler
*Assistant Examiner* — Mitchell T Oestreich
(74) *Attorney, Agent, or Firm* — W&G Law Group

(57) ABSTRACT

Provided are an augmented reality optical module, including a first lens, a second lens, a third lens group, a first polarization modulation unit provided on a side of the third lens group and configured to modulate the light emitted by the image source into first circularly polarized light, an angle selection film provided on a first surface of one side of the first lens and configured to reflect light having an incidence angle greater than or equal to a first angle and transmit light having an incidence angle smaller than or equal to a second angle, and a second polarization modulation unit provided on the other side of the first lens and configured to modulate incident circularly polarized light into linearly polarized light.

13 Claims, 7 Drawing Sheets

AUGMENTED REALITY OPTICAL MODULE

CROSS-REFERENCE TO RELATED APPLICATIONS

The present application claims priority to Chinese Patent Application No. 201911418053.4, filed on Dec. 31, 2019, the content of which is incorporated herein by reference in its entirety.

TECHNICAL FIELD

Embodiments of the present disclosure relate to augmented reality technology, and in particular, to an augmented reality optical module.

BACKGROUND

Augmented Reality (AR) technology is a technology that uses a projection system to generate superimposition of a virtual image and a real-world information to improve users' perception of the real world, and a purpose of such a technology is to interact the virtual world with the real world on the screen. AR technology is widely used in many fields such as military, medicine, construction, education, engineering, film and television, entertainment and the like.

Augmented reality optical modules generally include two transflective lenses and one third lens group, and the transflective lens close to human eyes is generally at an angle of 45° with respect to an optical axis of light emitted by the module. In application, since the transflective lens is obliquely arranged, the ambient light incident under the transflective lens will also irradiate the transflective lens and enters the human eyes after being reflected, during which interference may be generated, negatively affecting user experience.

SUMMARY

An embodiment of the present disclosure provides an augmented reality optical module, for superimposing light emitted by an image source on ambient light to form an augmented reality image. The augmented reality optical module includes a first lens; a second lens; a third lens group; a first polarization modulation unit provided on a side of the third lens group and configured to modulate the light emitted by the image source into first circularly polarized light; an angle selection film provided on a first surface of one side of the first lens, the angle selection film being configured to reflect light having an incidence angle greater than or equal to a first angle and transmit light having an incidence angle smaller than or equal to a second angle; and a second polarization modulation unit provided on the other side of the first lens and configured to modulate incident circularly polarized light into linearly polarized light. The first lens and the second lens have a transflective effect on visible light. The light emitted by the image source is transmitted along such a transmission path that the light emitted by the image source is transmitted through the third lens group and the first polarization modulation unit to form the first circularly polarized light, the first circularly polarized light is incident on the angle selection film at a first incidence angle and reflected by the angle selection film, the reflected light is incident on a first surface of the second lens and reflected by the second lens, and then is incident on the angle selection film at a second incidence angle and transmitted through the angle selection film, the first lens, and the second polarization modulation unit, sequentially, to form imaging light. The ambient light is transmitted along such a transmission path that the ambient light is transmitted through the second lens, the transmitted light is incident on the angle selection film at a third incidence angle and transmitted through the angle selection film, the first lens, and the second polarization modulation unit, sequentially, and then superimposed on the imaging light. The first incidence angle is greater than or equal to the first angle, and the second incidence angle and the third incidence angle are both smaller than or equal to the second angle.

According to the technical solution of the embodiment of the present disclosure, by providing the first polarization modulation unit on one side of the third lens group, the first polarization modulation unit modulates the light emitted by the image source as the first circularly polarized light; by providing the angle selection film on the first surface of one side of the first lens, the angle selection film reflects light having an incidence angle greater than or equal to the first angle and transmits light having an incidence angle smaller than or equal to the second angle; by providing the second polarization modulation unit on the other side of the first lens, the second polarization modulation unit modulates the incident circularly polarized light into the linearly polarized light; the light emitted by the image source is transmitted by the third lens group and the first polarization modulation unit to form the first circularly polarized light, the first circularly polarized light is incident on the angle selection film at the first incidence angle greater than or equal to the first angle and reflected by the angle selection film, the reflected light is incident on the first surface of the second lens and reflected by the second lens again, the secondary reflected light is incident on the angle selection film at the second incidence angle smaller than or equal to the second angle and transmitted through the angle selection film, the first lens, and the second polarization modulation unit, sequentially, to form the imaging light; the ambient light is transmitted through the second lens, the transmitted light is incident on the angle selection film at a third incidence angle smaller than or equal to the second angle and transmitted through the angle selection film, the first lens and the second polarization modulation unit, sequentially, and then superimposed on the imaging light to form the augmented reality image; the obtrusive light under the augmented reality optical module is incident on and transmitted through the second polarization control unit to form a second circularly polarized light, the second circularly polarized light is incident on the angle selection film at an incidence angle greater than or equal to the first angle and reflected by the angle selection film, and it can be only transmitted after being modulated by the second polarization control unit again. Therefore, the augmented reality image will not be interfered by stray light, and the human eye cannot observe unwanted images, thereby improving the user experience.

DESCRIPTION OF EMBODIMENTS

Figure 1:
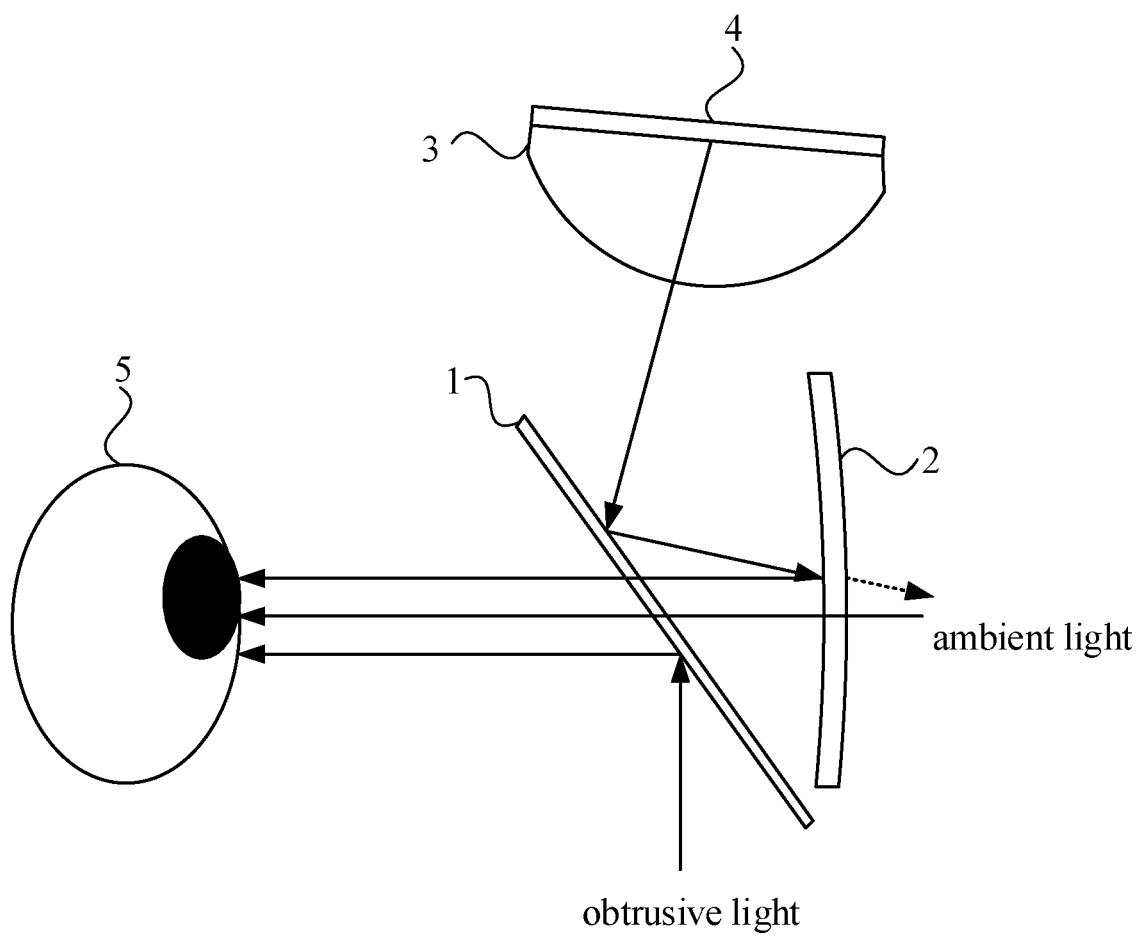
FIG. 1 is a structural schematic diagram of an augmented reality optical module.

The present disclosure will be further described in detail below with reference to the drawings and embodiments. It should be understood that the specific embodiments described herein are only configured to explain the present disclosure, rather than to limit the present disclosure. In addition, it should be noted that, for the purpose of description, the drawings only show part structures related to the present disclosure but not all structures.

The terms used in the embodiments of the present disclosure are merely for the purpose of describing specific embodiments and are not intended to limit the present disclosure. It should be noted that, in the embodiments of the present disclosure, terms for describing orientation and direction, such as "on", "under", "left", and "right" are described from perspectives shown in the drawings, but should not be interpreted as limitations to the embodiments of the present disclosure. In addition, in this context, it should also be understood that, when one element is described as being formed "on" or "under" another element, it can not only be formed directly "on" or "under" another element, but also formed indirectly "on" or "under" another element through an intermediate element. The terms such as "first", "second", etc. are merely for descriptive purposes to distinguish different components, rather than representing any order, quantity, or importance. Those skilled in the art can understand the specific meanings of the above terms in the present disclosure according to specific situations.

FIG. 1 is a structural schematic diagram of an augmented reality optical module. Referring to FIG. 1, the augmented reality optical module includes a first transflective lens 1, a second transflective lens 2, and a third lens 3, which are configured to superimpose light emitted from a display screen 4 and ambient light to produce an augmented reality effect. A basic principle thereof is as follows: the light emitted from the display screen 4 is irradiated onto the first transflective lens 1 after passing through the third lens 3, reflected by the first transflective lens 1 to the second transflective lens 2, and reflected again by the second transflective lens 2, then passes through the first transflective lens 1 and then is emitted into a human eye 5. The ambient light directly transmitted by the second transflective lens 2 and the first transflective lens 1 is incident on the human eye 5 and imaged on a retina. Thus, a virtual image generated by the display screen 4 is superimposed in a real environment to form the augmented reality effect. The arrows in FIG. 1 are intended to illustrate propagation directions of light, which may be deflected due to lens refraction and other effects during actual light transmission (not shown in FIG. 1). Referring to FIG. 1, since the first transflective lens 1 is disposed obliquely, the ambient light under the augmented reality optical module is incident on the first transflective lens 1 and reflected, and then incident on the human eye, generating an interference image to affect the imaging effect of the augmented reality.

Figure 2:
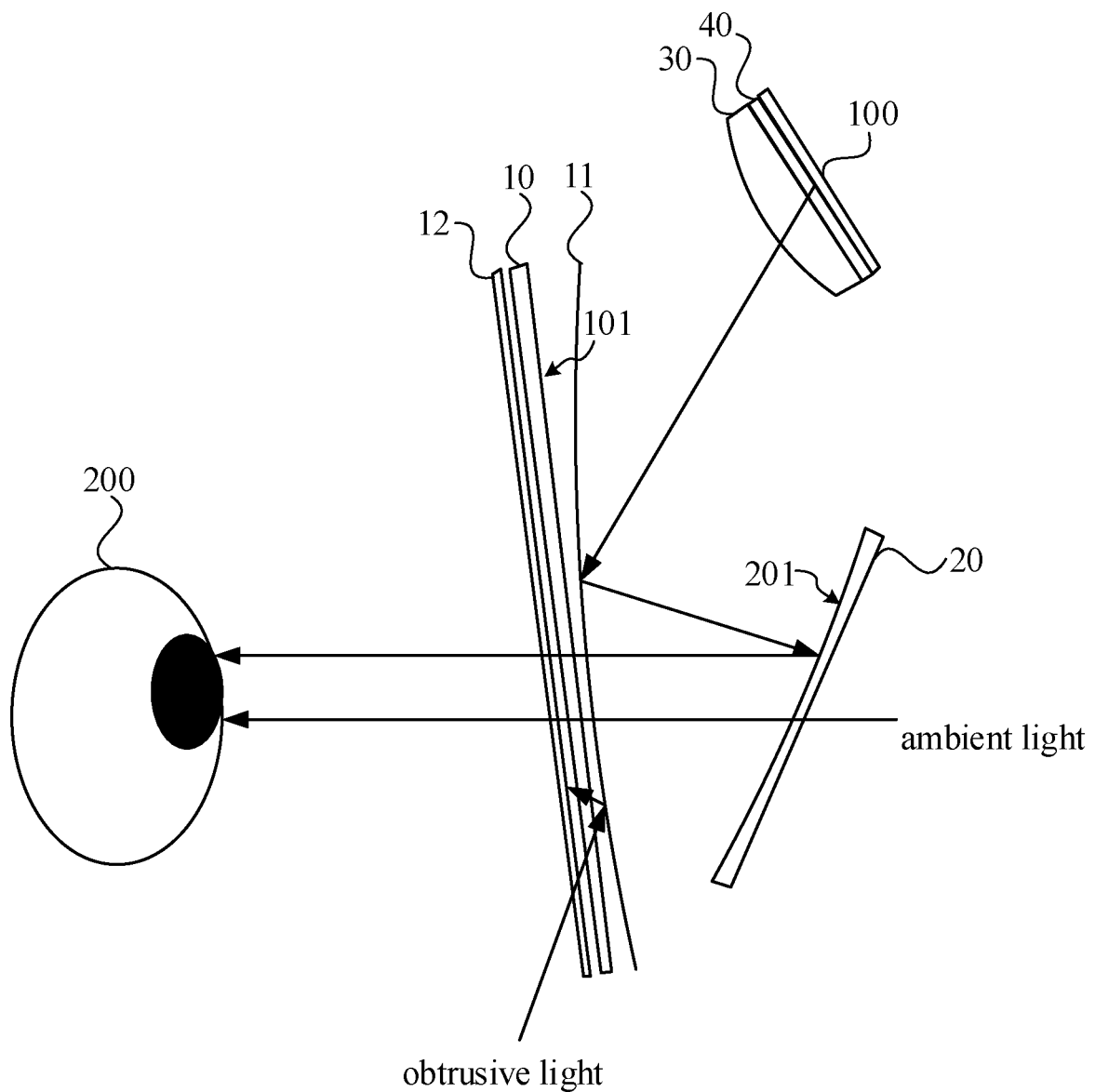
FIG. 2 is a structural schematic diagram of an augmented reality optical module according to an embodiment of the present disclosure.

In order to solve the above problems, an embodiment of the present disclosure provides an augmented reality optical module. FIG. 2 is a structural schematic diagram of an augmented reality optical module provided by an embodiment of the present disclosure, which is configured to superimpose the light emitted by an image source with the ambient light to form an augmented reality image. The augmented reality optical module includes a first lens 10, a second lens 20, and a third lens group 30. The first lens 10 and the second lens 20 have a transflective effect on visible light. The third lens group 30 is provided with a first polarization modulation unit 40 on one side, and the first polarization modulation unit 40 is configured to modulate the light emitted by the image source 100 into first circularly polarized light. An angle selection film 11 is provided on a first surface 101 of the first lens 10. The angle selection film 11 reflects light having an incidence angle greater than or equal to a first angle and transmits light having an incidence angle smaller than or equal to a second angle. A second polarization modulation unit 12 is provided on the other side of the first lens 10, and the second polarization modulation unit 12 is configured to modulate the incident circularly polarized light into linearly polarized light. A transmission path of the light emitted by the image source 100 is described as below: the light emitted by the image source 100 is transmitted through the third lens group 30 and the first polarization modulation unit 40 to form first circularly polarized light; the first circularly polarized light is incident on the angle selection film 11 at a first incidence angle and reflected by the angle selection film 11; the reflected light is incident and reflected again on a first surface 201 of the second lens 20; the secondary reflected light is incident on the angle selection film 11 at a second incidence angle and transmitted through the angle selection film 11, the first lens 10, and the second polarization modulation unit 12, sequentially, so as to form imaging light. A transmission path of the ambient light is described as below: the ambient light is transmitted through the second lens 20, the transmitted light is incident on the angle selection film 11 at a third incidence angle and transmitted through the angle selection film 11, the first lens 10, and the second polarization modulation unit 12, sequentially, and then superimposed on the imaging light. The first incidence angle is greater than or equal to the first angle, and the second incidence angle and the third incidence angle are both smaller than or equal to the second angle.

It can be understood that the image source 100 may be a display screen, for example, a liquid crystal display screen, an organic light-emitting display screen, etc., for providing an image. A light emission surface of the image source 100 faces towards the third lens group 30, and the third lens group 30 can be configured to magnify the image outputted by the image source 100. In an embodiment, the third lens group 30 includes at least one lens. For example, the third lens group 30 shown in FIG. 2 includes one convex lens. In other embodiments, the third lens group 30 may include one lens or a plurality of lenses, in order to meet requirements of image clarity. The specific structure of the third lens group 30 is not limited in the embodiments of the present disclosure, and the following embodiments are examples in which the third lens group 30 includes one lens. In a specific embodiment, the first polarization modulation unit 40 may include a polarizer and a quarter wave plate, the polarizer is configured to modulate the light emitted by the image source 100 into linearly polarized light, and the quarter wave plate is configured to modulate the linearly polarized light into first circularly polarized light. Both the first lens 10 and the second lens 20 are transflective lenses, for example, they can be transflective lenses each having a 50/50 beam-splitting ratio. For example, in an embodiment, the angle selection film 11 reflects light having an incidence angle greater than or equal to 42° and transmits light having an incidence angle smaller than or equal to 28°. When the first circularly polarized light emitted from the third lens group 30 is incident on the angle selection film 11 located on the first surface 101 of the first lens 10 at an incidence angle from 42° to 54°, and the angle selection film 11 has the function of reflection and reflects the light to the second lens 20. When the light is incident on the first lens 10 again at the incidence angle from 0° to 26° after being reflected between the first lens 10 and the second lens 20, the angle selection film 11 has a transmission function and the light is modulated by and transmitted through the second polarization modulation unit as the linearly polarized light, which is incident on the human eye 200, and thus the human eye 200 can observe the image of the image source 100. Since the first lens 10 and the second lens 20 have the transflective effect on the visible light, a part of the ambient light incident on the second lens 20 will be transmitted through the second lens 20 and then incident on the first lens 10, and the light having an incidence angle smaller than or equal to 28° is transmitted again and then incident on the human eye 200, and thus the human eye 200 can observe the augmented reality image.

In this embodiment, the second polarization modulation unit 12 is also configured to block obtrusive light. The obtrusive light under the augmented reality optical module becomes second circularly polarized light after passing through the second polarization modulation unit 12. When the obtrusive light is incident on the angle selection film 11 at an incidence angle greater than 45°, and then it is reflected by the angle selection film 11, and it is absorbed when passing through the second polarization modulation unit 12, thereby preventing the obtrusive light from being reflected by the first lens 10 to the human eye 200. In this way, an anti-interference performance of the augmented reality optical module can be improved.

It should be noted that it is merely illustrative in FIG. 2 that the first polarization modulation unit 40 is located between the image source 100 and the third lens group 30. In other embodiments, the first polarization modulation unit 40 may be located on a side of the third lens group 30 facing away from the image source 100, as long as the light incident on the first lens 10 can be formed as the first circularly polarized light. The incidence angles on the angle selection film 11 for reflecting and transmitting in the above embodiments are only illustrative. In specific implementations, an appropriate angle selection film can be selected according to actual structures.

According to the technical solution of the embodiment of the present disclosure, by providing the first polarization modulation unit on one side of the third lens group, the first polarization modulation unit modulates the light emitted by the image source as the first circularly polarized light; by providing the angle selection film on the first surface of one side of the first lens, the angle selection film reflects light having an incidence angle greater than or equal to the first angle and transmits light having an incidence angle smaller than or equal to the second angle; by providing the second polarization modulation unit on the other side of the first lens, the second polarization modulation unit modulates the incident circularly polarized light into the linearly polarized light; the light emitted by the image source is transmitted by the third lens group and the first polarization modulation unit to form the first circularly polarized light, the first circularly polarized light is incident on the angle selection film at the first incidence angle greater than or equal to the first angle and reflected by the angle selection film, the reflected light is incident on the first surface of the second lens and reflected by the second lens again, the secondary reflected light is incident on the angle selection film at the second incidence angle smaller than or equal to the second angle and transmitted through the angle selection film, the first lens, and the second polarization modulation unit, sequentially, to form the imaging light; the ambient light is transmitted through the second lens, the transmitted light is incident on the angle selection film at a third incidence angle smaller than or equal to the second angle and transmitted through the angle selection film, the first lens and the second polarization modulation unit, sequentially, and then superimposed on the imaging light to form the augmented reality image; the obtrusive light under the augmented reality optical module is incident on and transmitted through the second polarization control unit to form a second circularly polarized light, the second circularly polarized light is incident on the angle selection film at an incidence angle greater than or equal to the first angle and reflected by the angle selection film, and it can be only transmitted after being modulated by the second polarization control unit again. Therefore, the augmented reality image will not be interfered by stray light, and the human eye cannot observe unwanted images, thereby improving the user experience.

Figure 3:
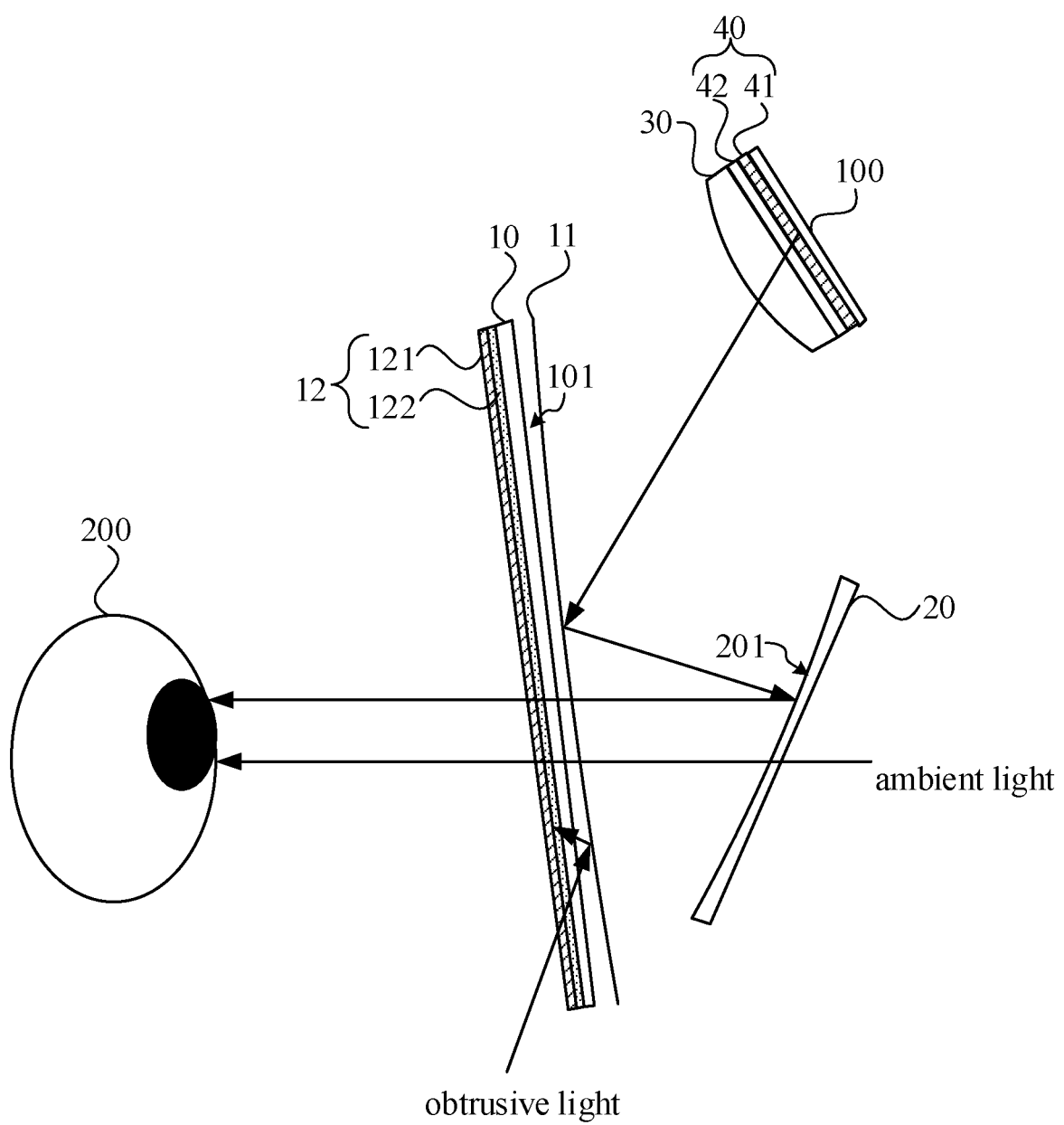
FIG. 3 is a structural schematic diagram of another augmented reality optical module according to an embodiment of the present disclosure.

On basis of the above embodiment, FIG. 3 is a structural schematic diagram of another augmented reality optical module provided by an embodiment of the present disclosure. Referring to FIG. 3, the first polarization modulation unit 40 includes a first absorptive polarizer 41 and a first quarter wave plate 42, and the first quarter wave plate 42 is located on a side of the first absorptive polarizer 41 facing away from the image source 100.

It can be understood that the first absorptive polarizer 41 is configured to modulate the light emitted by the image source 100 as linearly polarized light, and the first quarter wave plate 42 is configured to modulate the linearly polarized light as the first circularly polarized light. The absorptive polarizer refers to a polarizer that transmits p light and absorbs s light, a polarization direction of the p light is in a plane (incidence plane) formed by the incident light and a normal line, and a polarization direction of the s light is perpendicular to the incidence plane. In other embodiments, for example, when the light emitted by the image source 100 is linearly polarized light, the first polarization modulation unit 40 may not be provided with the first absorptive polarizer 41.

Further referring to FIG. 3, the second polarization modulation unit 12 includes a second absorptive polarizer 121 and a three-quarter wave plate 122, and the three-quarter wave plate 122 is located between the second absorptive polarizer 121 and the first lens 10.

It can be understood that the three-quarter wave plate 122 is configured to modulate the first circularly polarized light as p light, and the p light is transmitted through the second absorptive polarizer 121 to form imaging light. In a specific implementation, the angle selection film 11 and the second polarization modulation unit 12 may be respectively attached to two surfaces of the first lens 10 to simplify a supporting and fixing structure. The second polarization modulation unit 12 blocks the obtrusive light in such a manner that the obtrusive light changes from natural light to the p light after passing through the second absorptive polarizer 121, and then becomes the second circularly polarized light after passing through the three-quarter wave plate 122, the light is incident on and reflected by the angle selection film 11, the reflected light is incident on the three-quarter wave plate 122 again and then becomes the s light, which is absorbed by the second absorptive polarizer 121 and does not enter the human eye 200 to form a ghost image. In an embodiment, the three-quarter wave plate includes a combination of a quarter wave plate and a half wave plate. The specific implementation can be designed according to the actual scenarios.

Figure 4:
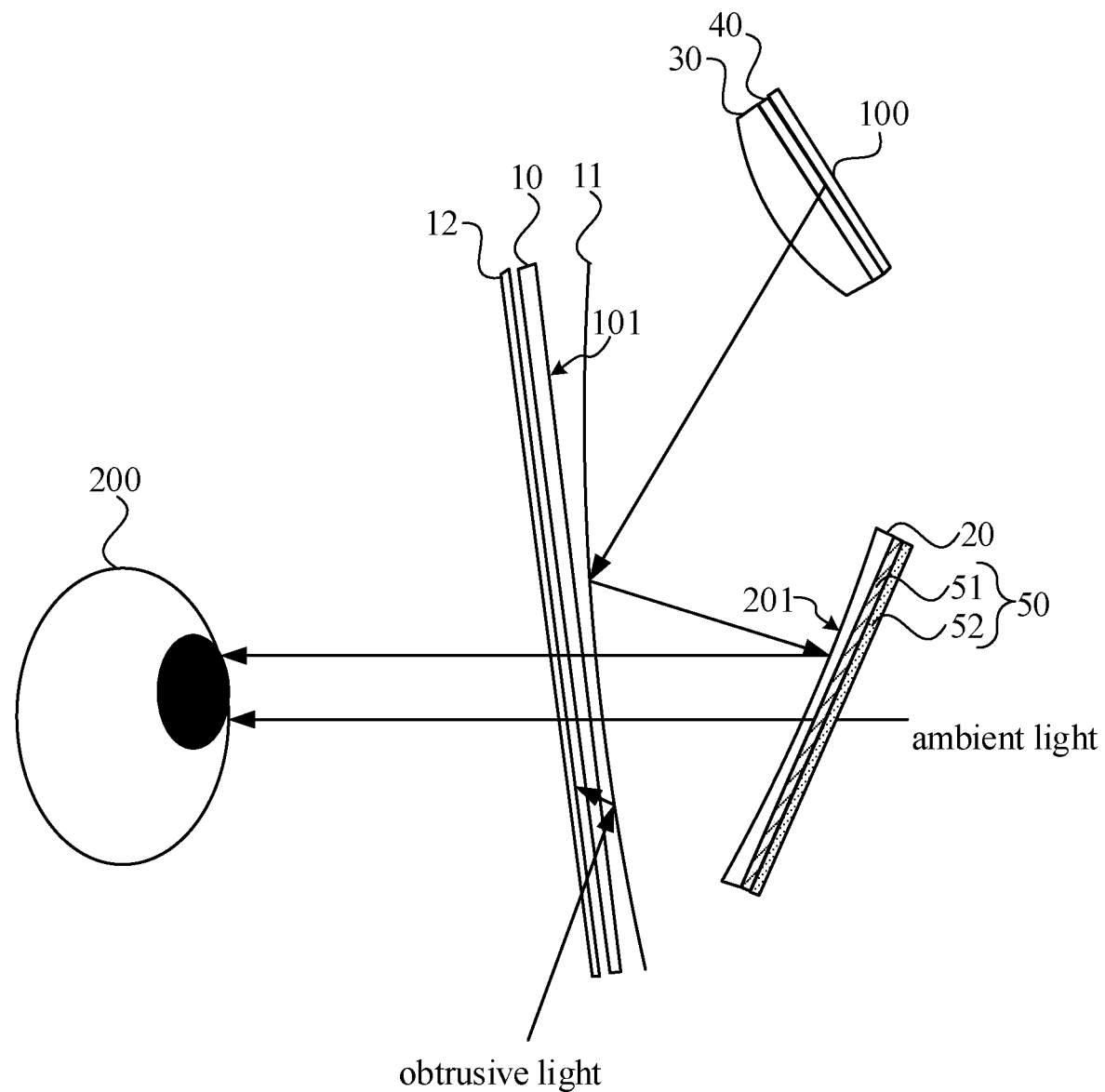
FIG. 4 is a structural schematic diagram of yet another augmented reality optical module according to an embodiment of the present disclosure.

Further referring to FIG. 1, since the second transflective lens 2 has a transflective effect, a part of the light reflected by the first transflective lens 1 to the second transflective lens 2 may be transmitted through the second transflective lens 2 (indicated by a dotted line in FIG. 1), which may cause privacy leakage. FIG. 4 is a structural schematic diagram of yet another augmented reality optical module provided by an embodiment of the present disclosure. Referring to FIG. 4, the augmented reality optical module provided in this embodiment further includes a third polarization modulation unit 50 disposed on the side of the second lens 20 facing away from the first lens 10, and the third polarization modulation unit 50 is configured to prevent the first circularly polarized light incident on the second lens 20 from being transmitted through the second lens 20.

It can be understood that, by providing the third polarization modulation unit 50, a part of the circularly polarized light reflected by the angle selection film 11 to the second lens 20 is blocked from exiting, thereby protecting user's privacy, while the incident ambient light is natural light and can be partially transmitted after passing through the third polarization modulation unit 50, which will not to affect the function of the augmented reality. For example, the third polarization modulation unit 50 may include a combination of a quarter wave plate and a polarizer, and the quarter wave plate is configured to modulate the first circularly polarized light as linearly polarized light, then an absorption axis of the polarizer is set to be parallel to the polarization direction of the linearly polarized light, thereby blocking the light from being transmitted.

With reference to FIG. 4, the third polarization modulation unit 50 includes a third absorptive polarizer 51 and a second quarter wave plate 52, and the third absorptive polarizer 51 is located between the second quarter wave plate 52 and the second lens 20.

It can be understood that in a specific embodiment, the third polarization modulation unit 50 may be attached to the surface of the second lens 20 to minimize the fixing and supporting structure, so as to simplify the structure of the augmented reality optical module. In other embodiments, the third polarization modulation unit 50 may also be any other combinations, for example, a combination of a multi-layered polarizer and a quarter wave plate, as long as it can block the emission of the first circularly polarized light without affecting the transmission of the external ambient light.

Further with reference to FIG. 3 or FIG. 4, the first lens 10 may be a flat beam-splitting reflective mirror.

It can be understood that, in this embodiment, by providing the first lens 10 as the flat beam-splitting reflective mirror, the angle selection film 11 on the flat beam-splitting reflective mirror directly reflects the light to the second lens 20, to avoid a relatively large aberration when the light is turned back.

In an embodiment, the first surface 101 of the first lens 10 is any one of a spherical surface, an aspheric surface, or a free-form surface.

In an embodiment, the first surface 201 of the second lens 20 is any one of a spherical surface, an aspheric surface, or a free-form surface.

For example, in an embodiment, the first surface 101 of the first lens 10 and the first surface 201 of the second lens 20 are both free-form surfaces satisfying:

$$z = \frac{c\rho^2}{1 + [1 - (1+k)c^2\rho^2]^{1/2}} + \sum_{i=1}^{N} A_i E_i(x, y);$$

where c is a radius of curvature, k is a quadric surface coefficient, $\rho^2 = x^2 + y^2$, N is a total number of polynomial coefficients in a series, $A_i$ is a coefficient of an $i^{th}$ expansion formula, the polynomial is just a power series in x and y directions, each data value at a positions where x and y are equal will be divided by a normalized radius, to obtain a polynomial coefficient having no dimension. Table 1 shows parameters of the surface shapes of the first surface 101 of the first lens 10 and the first surface 201 of the second lens 20.

TABLE 1

Parameters of Surface Shape of Free-form Surface

|  | Optical Surface 101 | Optical Surface 201 |
| --- | --- | --- |
| Center Curvature Radius | 106.49 | −72.19 |
| Quadratic Conic Coefficient | 2.29 | 3.22 |
| Normalized Radius | 10 | 10 |
| Max Term | 25 | 25 |
| X2Y0 Coefficient | −0.92054 | −0.11196 |
| X0Y2 Coefficient | −0.00812 | 0.16531 |
| X2Y1 Coefficient | −0.48983 | −0.04669 |
| X0Y3 Coefficient | −0.10441 | −0.06583 |
| X4Y0 Coefficient | 0.00000 | 0.00010 |
| X2Y2 Coefficient | 0.01089 | 0.01837 |
| X0Y4 Coefficient | 0.02884 | 0.02579 |
| X4Y1 Coefficient | 0.13292 | −0.00951 |
| X2Y3 Coefficient | 0.08419 | −0.01730 |
| X0Y5 Coefficient | −0.00701 | −0.00329 |
| X6Y0 Coefficient | 0.49923 | 0.00259 |
| X4Y2 Coefficient | −0.16581 | 0.00861 |
| X2Y4 Coefficient | 0.00222 | 0.01085 |

The third lens group 30 includes an aspheric lens, and at least one surface of the aspheric lens is aspherical and configured to correct off-axis aberrations, and a formula of the surface shape satisfies:

$$z = \frac{c\rho^2}{1 + [1 - (1+k)c^2\rho^2]^{1/2}} + a_1 r^2 + a_2 r^4 + a_3 r^6 + a_4 r^8 + a_5 r^{10} + a_6 r^{12},$$

where c is a radius of curvature, k is a quadric surface coefficient, $\rho^2 = x^2 + y^2$, and Table 2 shows parameters of the surface shape of the aspheric surface:

TABLE 2

Parameters of Surface Shape of Aspherical Surface

| Center Curvature Radius | 15.730 |
| --- | --- |
| Quadratic Conic Coefficient | −0.224 |
| r^2 Coefficient |  |

TABLE 2-continued

Parameters of Surface Shape of Aspherical Surface

| r^4 Coefficient | 1.05E−05 |
|---|---|
| r^6 Coefficient | −2.39E−07 |
| r^8 Coefficient | 3.92E−08 |
| r^10 Coefficient | 9.98E−10 |
| r^12 Coefficient | −2.49E−11 |

Figure 5:
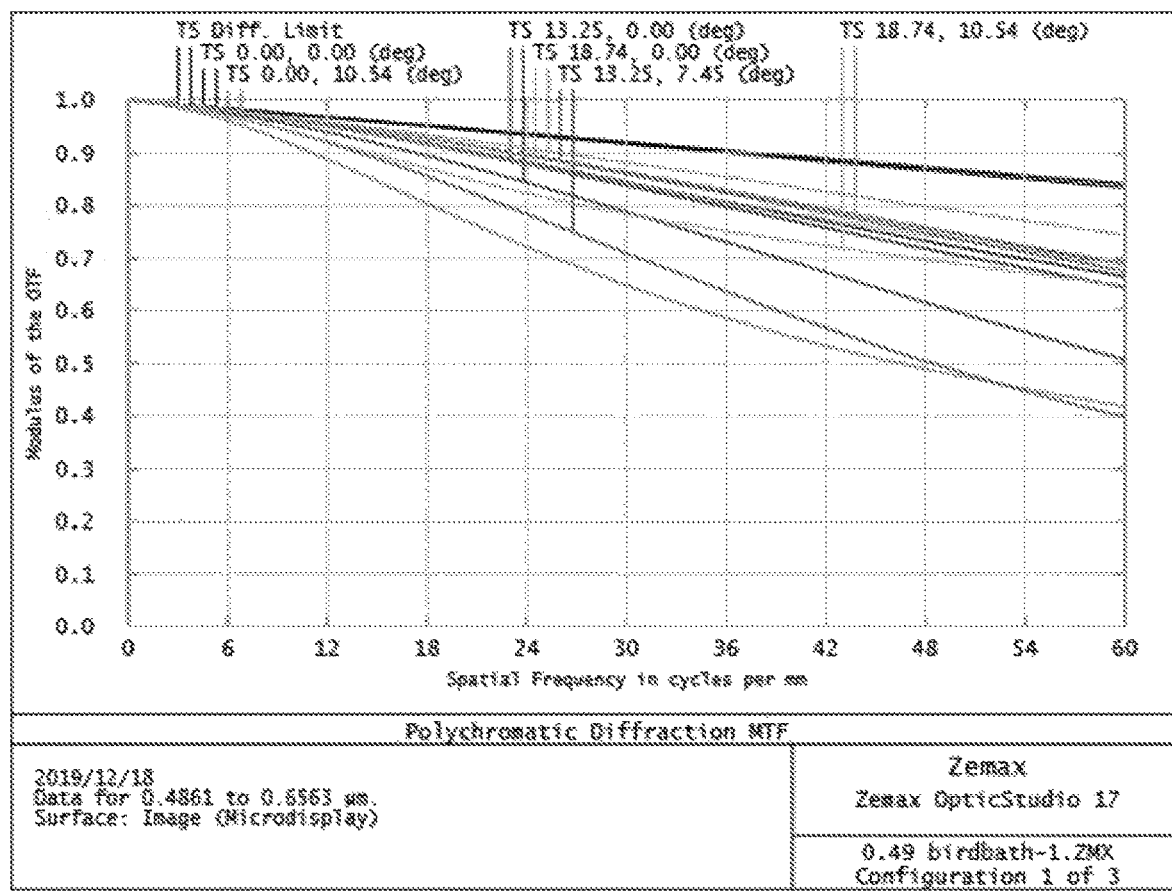
FIG. 5 is a schematic diagram of an optical transfer function MTF curve of an optical system according to an embodiment.

FIG. 5 shows a schematic diagram of an optical transfer function MTF curve of an optical system in the present embodiment, and the optical system allows the MTF of each field of view (center and edge fields of view) greater than 0.3 at a spatial resolution of 60 lp/mm (line pair/mm) and has good imaging performance.

In an embodiment, the first surface of the second lens is plated with a transflective film.

Figure 6:
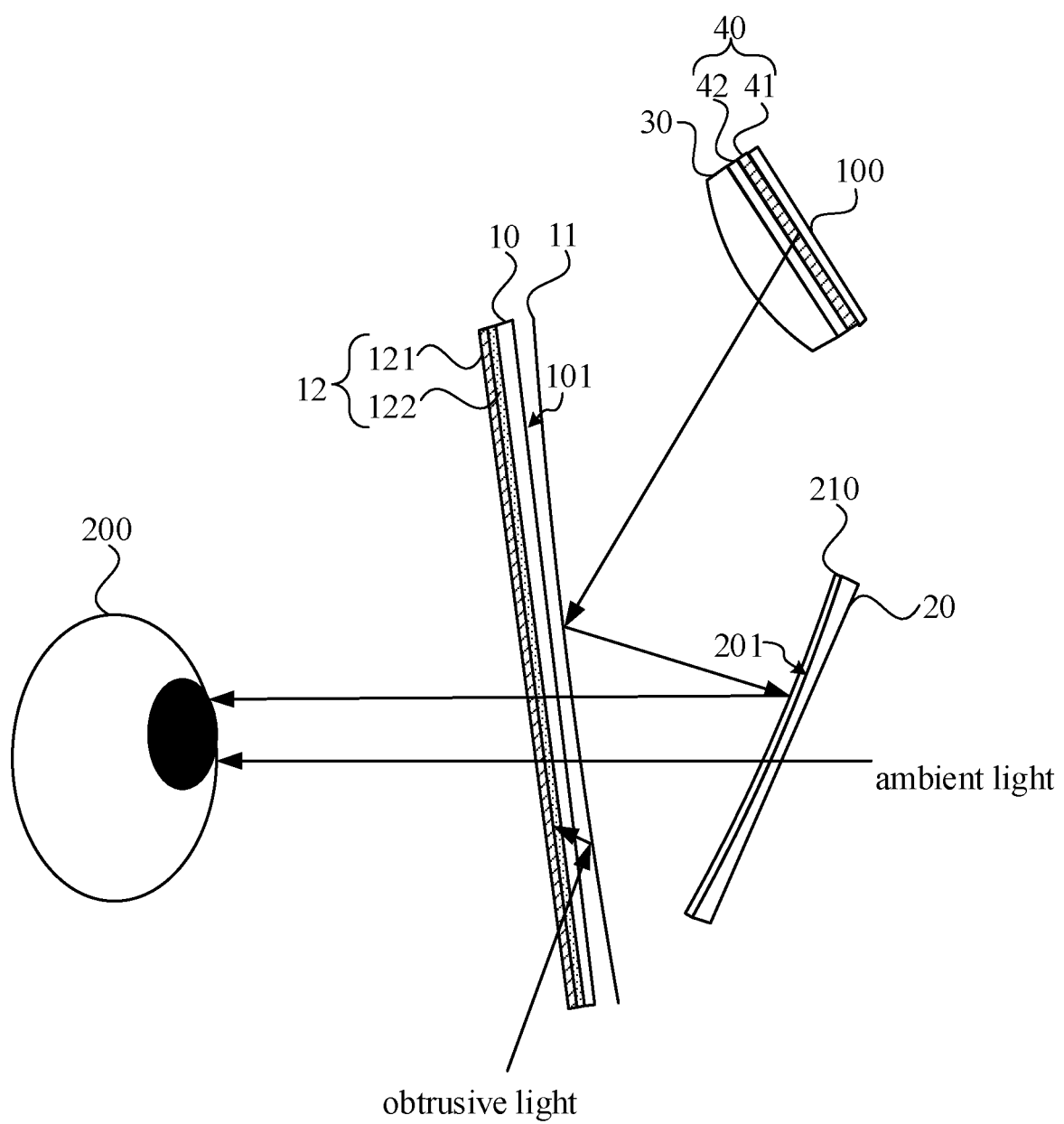
FIG. 6 is a structural schematic diagram of yet another augmented reality optical module according to an embodiment of the present disclosure.

For example, FIG. 6 is a structural schematic diagram of yet another augmented reality optical module provided by an embodiment of the present disclosure. Referring to FIG. 6, the first surface 201 of the second lens 20 is plated with a transflective film 210.

It can be understood that, in an embodiment, the transflective film 210 may have a beam-splitting ratio of 50/50. In other embodiments, the transflective film 210 may also be disposed on the other surface, and a transflective ratio of the transflective film 210 can be set according to actual needs to adjust a brightness ratio of the virtual image to the ambient light. For example, when the brightness of the ambient light is required to be relatively high, the transflective ratio of the transflective film 210 can be set to be 60/40, thereby transmitting more ambient light; when the brightness of the image of the image source is required to be relatively high, the transflective ratio of the transflective film 210 can be set to be 40/60. It can be designed according to actual needs in specific embodiments, so as to adapt to different application scenarios. Further, in an embodiment, the transflective film 210 can also be completely reflective, which can be used as a virtual reality optical module.

Figure 7:
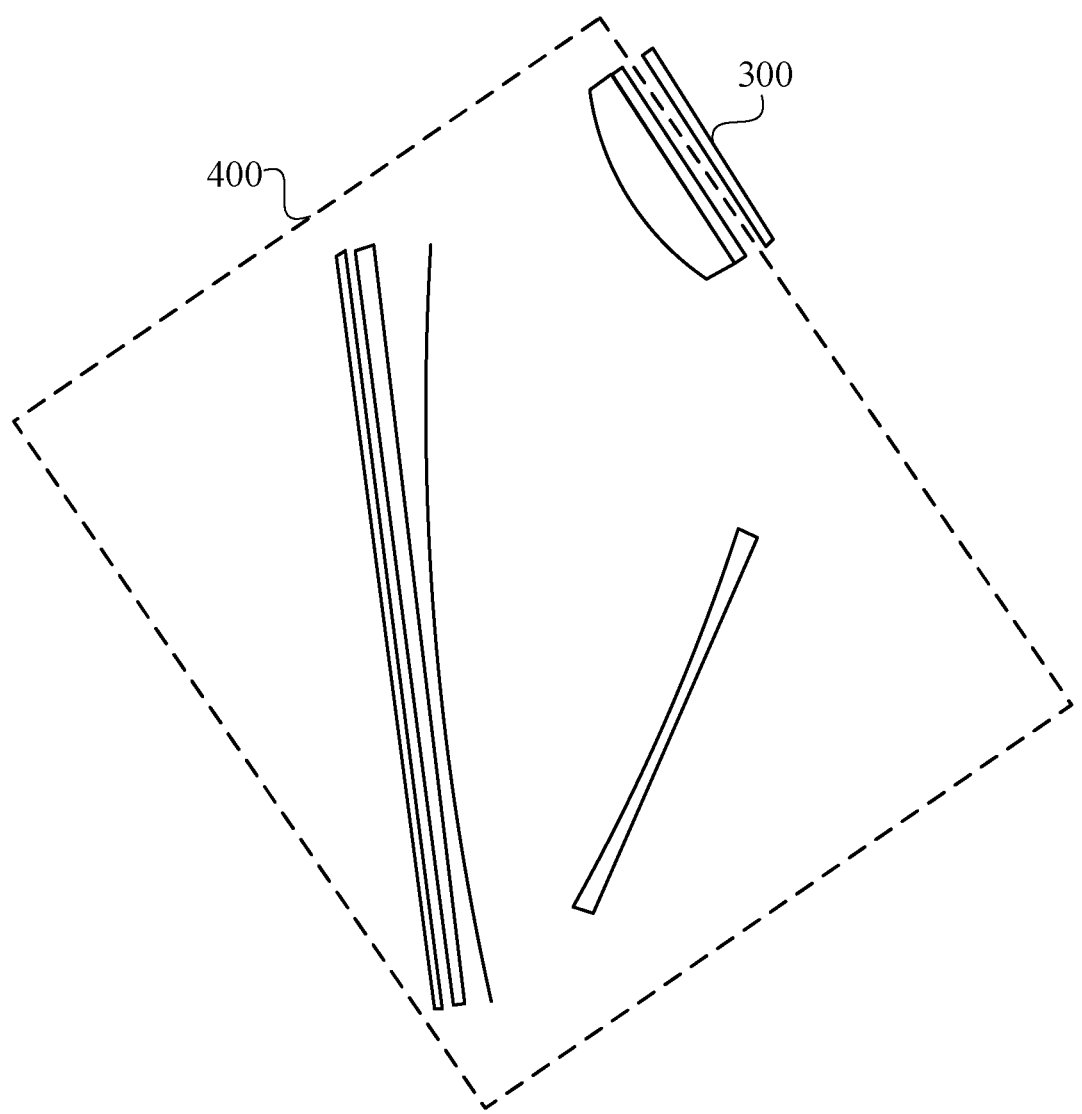
FIG. 7 is a structural schematic diagram of an augmented reality apparatus according to an embodiment of the present disclosure.

FIG. 7 is a structural schematic diagram of an augmented reality apparatus according to an embodiment of the present disclosure. Referring to FIG. 7, the augmented reality apparatus provided in this embodiment includes a display screen 300 and the augmented reality optical modules 400 described in any one of the above embodiment, and the third lens group of the augmented reality optical module 400 is located on a light-exiting side of the display screen 300. In an embodiment, the display screen 300 includes a liquid crystal display screen or an organic light-emitting display screen.

The display screen 300 can also be an OLED (Organic Light-Emitting Display) on Silicon screen. The OLED on Silicon screen is based on a single crystal silicon wafer, having a pixel size about 1/10 of that of a conventional display, and it has advantages such as low power consumption, small volume and high resolution and thus is very suitable for the augmented reality apparatuses for close-up observation.

The augmented reality apparatus provided by the embodiment of the present disclosure includes the augmented reality optical modules provided by any one of the above embodiments, and has the same or corresponding technical effects, which will not be described in detail herein.

It should be understood that the above are only the preferred embodiments of the present disclosure and the applied technical principles. Those skilled in the art will understand that the present disclosure is not limited to these specific embodiments described above, and can made various obvious changes, readjustments, combinations and substitutions without departing from the scope of the present disclosure. Therefore, although the present disclosure is described in detail through the above embodiments, the present disclosure is not limited thereto, and other equivalent embodiments are included without departing from the concept of the present disclosure. The scope of the present disclosure is defined by the appended claims.

The invention claimed is:

1. An augmented reality optical module, for superimposing light emitted by an image source on ambient light to form an augmented reality image, the augmented reality optical module comprising:
   a first lens;
   a second lens;
   a third lens group;
   a first polarization modulation unit provided on a side of the third lens group and configured to modulate the light emitted by the image source into first circularly polarized light;
   an angle selection film provided on a first surface of one side of the first lens, the angle selection film being configured to reflect light having an incidence angle greater than or equal to a first angle and transmit light having an incidence angle smaller than or equal to a second angle; and
   a second polarization modulation unit provided on the other side of the first lens and configured to modulate incident circularly polarized light into linearly polarized light,
   wherein the first lens and the second lens have a transflective effect on visible light,
   wherein the light emitted by the image source is transmitted along such a transmission path that the light emitted by the image source is transmitted through the third lens group and the first polarization modulation unit to form the first circularly polarized light, the first circularly polarized light is incident on the angle selection film at a first incidence angle and reflected by the angle selection film, the reflected light is incident on a first surface of the second lens and reflected by the second lens, and then is incident on the angle selection film at a second incidence angle and transmitted through the angle selection film, the first lens, and the second polarization modulation unit, sequentially, to form imaging light,
   wherein the ambient light is transmitted along such a transmission path that the ambient light is transmitted through the second lens, the transmitted light is incident on the angle selection film at a third incidence angle and transmitted through the angle selection film, the first lens, and the second polarization modulation unit, sequentially, and then superimposed on the imaging light, and
   wherein the first incidence angle is greater than or equal to the first angle, and the second incidence angle and the third incidence angle are both smaller than or equal to the second angle.

2. The augmented reality optical module according to claim 1, further comprising a third polarization modulation unit provided on a side of the second lens facing away from the first lens, wherein the third polarization modulation unit is configured to prevent the first circularly polarized light incident on the second lens from being transmitted through the second lens.

3. The augmented reality optical module according to claim 1, wherein the first polarization modulation unit comprises a first absorptive polarizer, and a first quarter wave plate located on a side of the first absorptive polarizer facing away from the image source.

4. The augmented reality optical module according to claim 3, wherein the second polarization modulation unit comprises a second absorptive polarizer, and a three-quarter wave plate located between the second absorptive polarizer and the first lens.

5. The augmented reality optical module according to claim 4, wherein the three-quarter wave plate comprises a combination of a quarter wave plate and a half wave plate.

6. The augmented reality optical module according to claim 2, wherein the third polarization modulation unit comprises a second quarter wave plate, and a third absorptive polarizer located between the second quarter wave plate and the second lens.

7. The augmented reality optical module according to claim 1, wherein the first lens is a flat beam-splitting reflective mirror.

8. The augmented reality optical module according to claim 1, wherein the first surface of the first lens is any one of a spherical surface, an aspheric surface, or a free-form surface.

9. The augmented reality optical module according to claim 1, wherein the first surface of the second lens is any one of a spherical surface, an aspheric surface, or a free-form surface.

10. The augmented reality optical module according to claim 1, wherein the first surface of the second lens is plated with a transflective film.

11. The augmented reality optical module according to claim 1, wherein the third lens group comprises at least one lens.

12. An augmented reality apparatus, comprising:
an augmented reality optical module, for superimposing light emitted by an image source on ambient light to form an augmented reality image, the augmented reality optical module including:
a first lens;
a second lens;
a third lens group;
a first polarization modulation unit provided on a side of the third lens group and configured to modulate the light emitted by the image source into first circularly polarized light;
an angle selection film provided on a first surface of one side of the first lens, the angle selection film being configured to reflect light having an incidence angle greater than or equal to a first angle and transmit light having an incidence angle smaller than or equal to a second angle; and
a second polarization modulation unit provided on the other side of the first lens and configured to modulate incident circularly polarized light into linearly polarized light; and
a display screen,
wherein the first lens and the second lens have a transflective effect on visible light,
wherein the light emitted by the image source is transmitted along such a transmission path that the light emitted by the image source is transmitted through the third lens group and the first polarization modulation unit to form the first circularly polarized light, the first circularly polarized light is incident on the angle selection film at a first incidence angle and reflected by the angle selection film, the reflected light is incident on a first surface of the second lens and reflected by the second lens, and then is incident on the angle selection film at a second incidence angle and transmitted through the angle selection film, the first lens, and the second polarization modulation unit, sequentially, to form imaging light,
wherein the ambient light is transmitted along such a transmission path that the ambient light is transmitted through the second lens, the transmitted light is incident on the angle selection film at a third incidence angle and transmitted through the angle selection film, the first lens, and the second polarization modulation unit, sequentially, and then superimposed on the imaging light,
wherein the first incidence angle is greater than or equal to the first angle, and the second incidence angle and the third incidence angle are both smaller than or equal to the second angle, and
wherein the third lens group of the augmented reality optical module is located on a light-exiting side of the display screen.

13. The augmented reality apparatus according to claim 12, wherein the display screen comprises a liquid crystal display screen or an organic light-emitting display screen.

* * * * *